(12) United States Patent
Knoedgen

(10) Patent No.: US 8,198,845 B2
(45) Date of Patent: Jun. 12, 2012

(54) DC CONVERTER USING MOTOR COIL

(75) Inventor: Horst Knoedgen, Munich (DE)

(73) Assignee: Digitál Imaging Systems GmbH, Kirchheim/Teck-Nabern (DE)

( * ) Notice: Subject to any disclaimer, the term of this patent is extended or adjusted under 35 U.S.C. 154(b) by 602 days.

(21) Appl. No.: 12/319,593

(22) Filed: Jan. 9, 2009

(65) Prior Publication Data
US 2010/0134062 A1 Jun. 3, 2010

(30) Foreign Application Priority Data
Dec. 1, 2008 (EP) .................................. 08392016

(51) Int. Cl.
*H02P 6/14* (2006.01)
(52) U.S. Cl. .................... 318/400.26; 318/599
(58) Field of Classification Search ............. 318/400.26, 318/400.27, 400.29, 811, 599
See application file for complete search history.

(56) References Cited

U.S. PATENT DOCUMENTS

| 5,377,094 | A | | 12/1994 | Williams et al. |
| 5,459,654 | A | | 10/1995 | Williams et al. |
| 5,483,436 | A | * | 1/1996 | Brown et al. ............... 363/98 |
| 6,664,750 | B2 | * | 12/2003 | Pelonis ..................... 318/400.29 |
| 6,710,574 | B2 | | 3/2004 | Davis et al. |
| 7,102,299 | B2 | * | 9/2006 | Jones et al. ................ 315/291 |
| 7,368,899 | B2 | | 5/2008 | Chi |
| 7,395,888 | B2 | | 7/2008 | Yamamoto et al. |
| 2003/0080710 | A1 | | 5/2003 | Tierling |
| 2003/0173922 | A1 | | 9/2003 | Pelonis |
| 2008/0055940 | A1 | | 3/2008 | Lawson et al. |

FOREIGN PATENT DOCUMENTS

| EP | 08392016.5-1242 | 3/2009 |
| WO | WO 2006/117061 | 11/2006 |

* cited by examiner

*Primary Examiner* — Rina Duda
(74) *Attorney, Agent, or Firm* — Saile Ackerman LLC; Stephen B. Ackerman

(57) ABSTRACT

Circuits and methods system for a DC-to-DC conversion using the inductance of a motor coil are disclosed. The invention is especially applicable for mobile electronic devices having a motor and requiring a DC-to-DC conversion. By using the coil of the motor for DC-to-DC conversion and for the purpose of a motor no space for an additional coil is required. For motor control an H-bridge arrangement is provided allowing motor movement in both directions, to brake and free run. By adding two diodes and a capacitor and modulation of a switch of the H-bridge a DC-to-DC conversion has been made possible.

16 Claims, 3 Drawing Sheets

DC CONVERTER USING MOTOR COIL

BACKGROUND OF THE INVENTION (1) Field of the Invention

This invention relates generally to DC-DC converters and relates more specifically to DC-to-DC converters in devices wherein a coil of an electric motor is used for an inductance required to convert a DC voltage.

(2) Description of the Prior Art

Electronic mobile devices are usually powered by DC sources such as batteries. A process that changes one DC voltage to a different DC voltage is called DC-to-DC conversion. Battery powered systems often stack batteries in series to achieve higher voltage. However, stacking batteries is not possible in many high voltage applications due to lack of space. Boost converters or step-up converters can increase the voltage and reduce the number of cells. A boost converter is a DC-to-DC converter with an output voltage greater than the source voltage. A boost converter is sometimes called a step-up converter since it "steps up" the source voltage. Since power must be conserved, the output current is lower than the source current.

Boost converters comprise usually an inductor to store energy from a DC-source as e.g. a battery, a switch, and a diode. The basic principle of a Boost converter consists in 2 distinct states. In the On-state, the switch is closed, resulting in an increase in the inductor current, in the Off-state, the switch is open and the only path offered to inductor current is through the diode D, the capacitor C and the load. This results in transferring the energy accumulated in the inductor during the On-state into the capacitor.

In regard of mobile electronic devices the challenge for the designer of such systems is to save space e.g. for the inductors required.

There are patents dealing with DC-to-DC converters:

U.S. Patent (U.S. Pat. No. 7,395,888 to Yamamoto et al.) teaches a vehicle drive device comprising an actuator located between an electric motor and axles for driving the vehicle, a built-in power source for supplying electric power to the actuator, and a control means for controlling the drive of the actuator. The built-in power source can be consisted of a battery, and the actuator can be consisted of an electromagnetic clutch. Here, the vehicle drive device further comprises a boost means, such as a DC-DC converter, for boosting voltage of the built-in power source such as the battery. The output voltage of the boost means is supplied electric power to the actuator such as the electromagnetic clutch. The output voltage of the boost means can be also supplied the electric power to the field coil of the electric motor.

U.S. Patent (U.S. Pat. No. 6,710,574 to Davis et al.) discloses a reversible DC motor drive including a DC/DC converter having a DC input, a first output having a first pulsed DC voltage and first DC voltage value, a second output having a second pulsed DC voltage and second DC voltage value, and a third output having a third pulsed DC voltage and third DC voltage value. The first and second outputs are adapted for electrical interconnection with armature terminals of a DC motor, and the third output is adapted for electrical interconnection with a field terminal of the motor. A microprocessor routine calculates motor speed from the motor armature voltage, field current and armature current. An outer control loop for motor speed and two separately controllable inner control loops for armature and field current control the DC/DC converter responsive to the calculated motor speed and a speed reference in order to independently control the three DC voltage values.

U.S. Patent (U.S. Pat. No. 7,368,899 to Chi) proposes a boost circuit including a DC/DC converter having a switch, receiving an input voltage and outputting an input voltage feedback signal, an output voltage feedback signal, an input current feedback signal and an output voltage after a boost of the input voltage, and a feedback control circuit having a pulse-width modulation limiting controller, coupled to the converter, receiving the input voltage feedback signal, the output voltage feedback signal and the input current feedback signal and generating an output signal with a fixed time period. The output signal is employed to control the switching of the switch so as to generate the boost.

SUMMARY OF THE INVENTION

A principal object of the present invention is to use an electric motor coil as inductor of a DC-to-DC converter A further object of the present invention is to save space for devices having a motor and requiring DC-to-DC conversion.

A further object of the present invention is to use an H-bridge motor control for DC-to-DC conversion.

In accordance with the objects of this invention a method to use an electric motor coil as inductor of a DC-to-DC converter has been achieved. The method invented comprises, first, the steps of (1) providing an electric motor having a coil, an H-bridge motor control, two diodes, a resistor, a supply voltage and a capacitor, and (2) increasing the current through said coil via a modulated switch in ON-state of said H-bridge. Second, the method comprises the steps of (3) transferring the energy accumulated in the coil during the On-state of the modulated switch to the capacitor during OFF state of said modulated switch, and (4) applying the voltage across said capacitor, wherein said voltage is higher than the supply voltage. Finally the method comprises the step (5) continuing modulating the switch causing storing energy in the coil and transferring subsequently the energy from the coil to the capacitor as long as the output voltage across the capacitor is required.

In accordance with the objects of this invention a system for a DC-to-DC conversion using the inductance of a motor coil has been achieved. The system invented comprises, first, an H-bridge motor control comprising a first switch having a first terminal connected to a supply voltage and a second terminal connected to a first terminal of a second switch and to a first terminal of a electric motor coil, said second switch having a second terminal connected to ground, a third switch having a first terminal connected to a supply voltage and a second terminal connected to a first terminal of a fourth switch and to a second terminal of said motor coil, said fourth switch having a second terminal connected to ground, and said motor coil. Finally, the system invented comprises a first diode having its anode connected to said first terminal of said motor coil and its cathode connected to a first terminal of a capacitor, a second diode having its anode connected to said second terminal of said motor coil and its cathode connected to a first terminal of a capacitor, and said capacitor, having its second terminal connected to ground, wherein the voltage across the capacitor is the output voltage of the DC-DC converter.

In accordance with the objects of this invention a system for a DC-to-DC conversion using the inductances of a electric motor has been achieved. The system invented comprises, first, a first pair of motor coils, comprising a first and a second coil connected in series, wherein a first terminal of a first coil is connected to a cathode of a first diode and to each of first terminals of a first and a second switch, wherein a second terminal of said first coil is connected to a cathode of a second diode, to each of first terminals of a third and a fourth switch, and to a first terminal of said second coil, and wherein a second terminal of said second coil is connected to a cathode of a third diode and to each of first terminals of a fifth and a sixth switch. Second, the system comprises said first, third, and fifth switches having all second terminals connected to a supply voltage, said second, fourth, and sixth switches having all second terminals connected to ground, said first, second and third diodes having all their cathodes connected to a first terminal of a capacitor, and said capacitor, having its second terminal connected to ground, wherein the voltage across the capacitor is the output voltage of the DC-DC converter. Third, the system comprises a second pair of motor coils, comprising a third and a fourth coil connected in series, wherein a first terminal of a first coil is connected to each of first terminals of a seventh and a eighth switch, wherein a second terminal of said first coil is connected to each of first terminals of a ninth and a tenth switch, and to a first terminal of said fourth coil, and wherein a second terminal of said second coil is connected to each of first terminals of a eleventh and a twelfth switch. Finally the system comprises said seventh, ninth, and eleventh switches having all second terminals connected to a supply voltage, said eighth, tenth, and twelfth switches having all second terminals connected to ground, and said supply voltage.

BRIEF DESCRIPTION OF THE DRAWINGS

In the accompanying drawings forming a material part of this description, there is shown.

DESCRIPTION OF THE PREFERRED EMBODIMENTS

The preferred embodiments disclose methods and systems to use an electric motor coil as inductor of a DC-to-DC converter. This especially advantageous for step-up or boost DC-to-DC converters. In a preferred embodiment of the invention a boost converter using a motor coil is disclosed. The invention can be used for step-down converters as well even the efficiency of such a system is lower than of a boost converter. It should be understood that the present invention can be used with any type of an electrical DC motor and also with relays having a coil.

Figure 1:
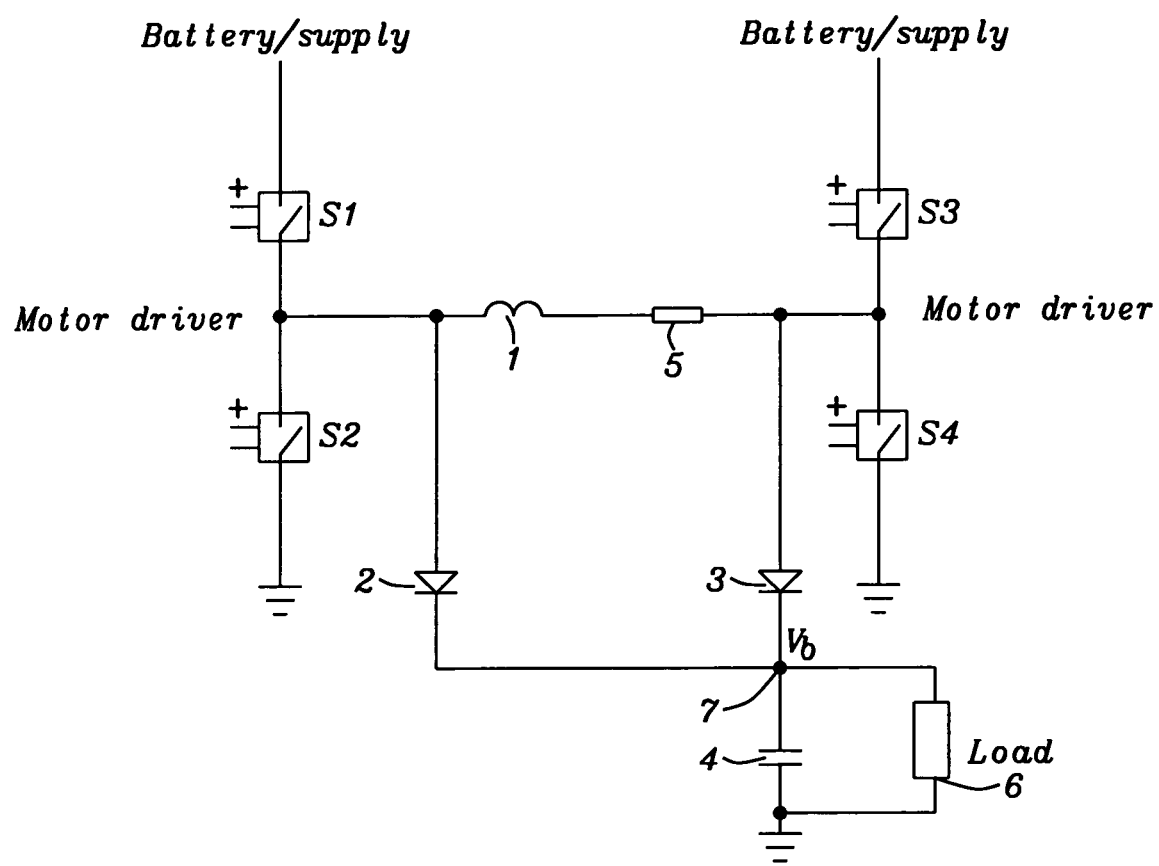
FIG. 1 illustrates a block diagram showing the principal building blocks of the invention.

FIG. 1 illustrates a block diagram showing the principal building blocks of the invention. A motor coil 1 is driven by an H-bridge comprising four switches S1 to S4. An H-bridge is an electronic circuit which enables DC electric motors to be run forwards or backwards, free runs or to brake. The H-bridge is deployed between a DC supply voltage and ground. In order to use the coil 1 for a boost DC-to-DC conversion the following elements are added to the H-bridge: two diodes 2 and 3, and a storage capacitor 4 driving a load 6. The resistor 5 indicates the resistance of the coil, which should be as low as possible to achieve a good performance of the DC-to-DC conversion. Alternatively the diode 2 can be replaced by an active rectifier, i.e. a switch, as being used with synchronous DC-to-DC converters.

A typical application for the boost converter disclosed would be the supply of a piezo motor or of a polymer actuator. Any other supply of a load requiring a high voltage is obviously possible as well.

The standard operation of the motor can be performed via the full H-bridge using switches S1-4.

By modulating one switch only, e.g. switch S2 with pulse width modulation (PWM), and closing switch S3 the circuit will perform as a boost converter via diode 2 and capacitor 4. The voltage $V_b$ at node 7 will be higher than the supply voltage. Due to the modulation the torque of the motor will be reduced. By alternating modulation, i.e. switch S4 modulates while switch S1 is closed the torque on average zero. In case a torque of zero is desired, the frequency of changing the modulating switches should be above the reaction frequency of a motor. A preferable frequency of changing the modulating switches is in the order of magnitude of about 20 KHz, because otherwise the changes could be heard. Every frequencies in the system should be outside of the hearing frequencies.

Without alternating the modulation between switches S2 and S4, i.e. only switch S2 (or only switch S4) modulates, the torque is well controlled in one direction. Alternatively other modulation modes are applicable as e.g. pulse skipping or alternate modulation, i.e. providing alternately one pulse for the torque of the motor (normal operation of a motor) and one pulse supporting the DC converter.

It is possible to split the coil 1 of the motor in a way that a part of the coil is used solely for a DC-to-DC conversion and the other part is used to move the motor in the direction desired.

Figure 3:
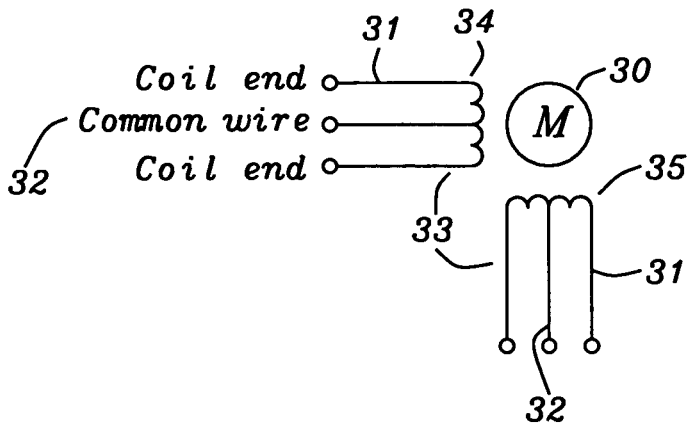
FIG. 3 illustrates an example of splitting the coil of an electric motor.

FIG. 3 illustrates an example of splitting the coils. FIG. 3 shows an example of a stepper motor, comprising a rotor 30, two split coils 34 and 35, wherein each split coil has a first coil end 31, a common wire 32, and a second coil end 33. Therefore the part of the coil between a first coil end and the common wire could be used for a DC-to-DC conversion and the part between a second coil end and the common wire could be used to move the rotor or vice versa. Alternatively instead of two split coils four single coils could be used.

Figure 4:
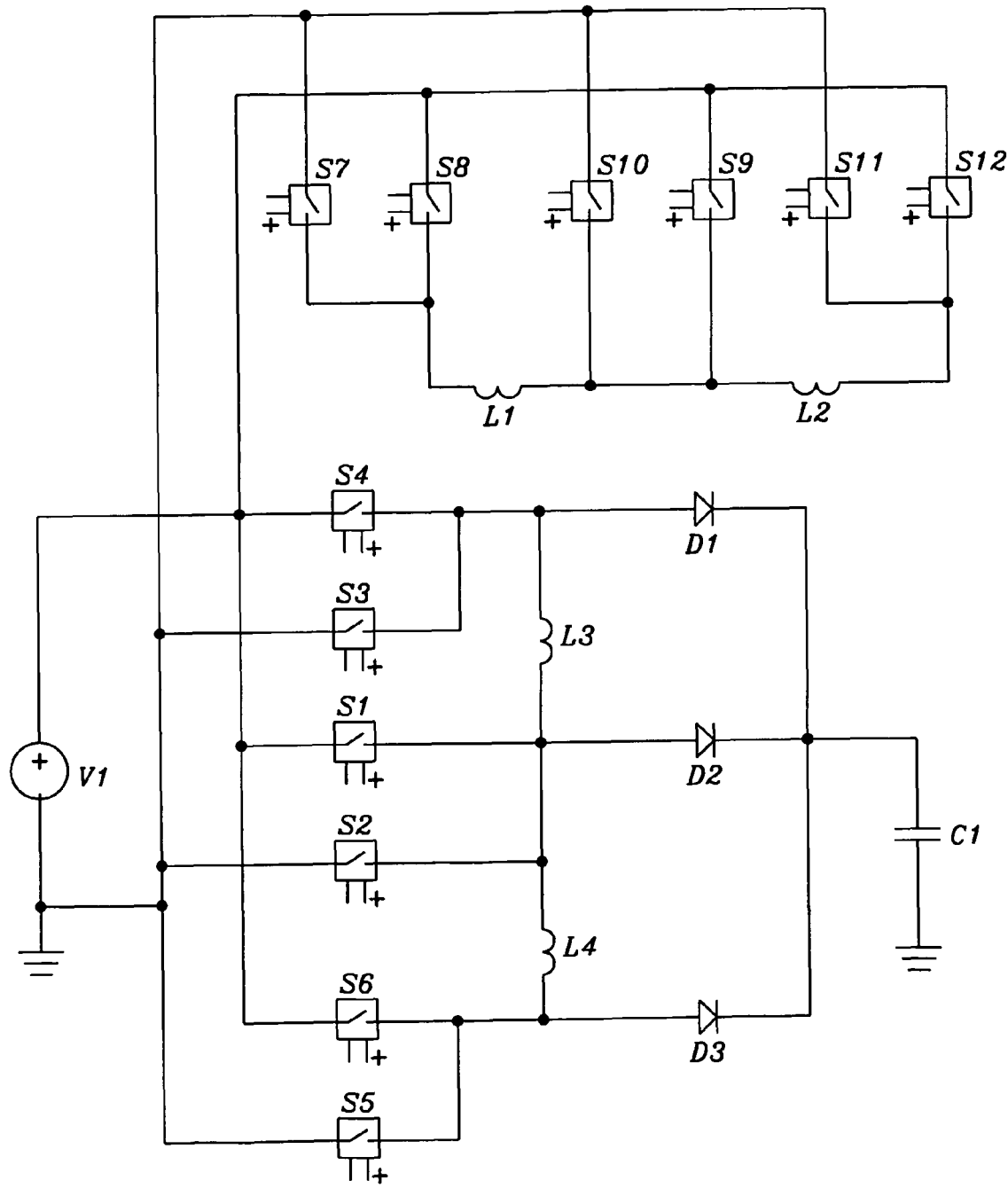
FIG. 4 illustrates a block diagram of an example of using four single coils with an electric motor.

FIG. 4 illustrates a block diagram of an example of using four single coils L1-L4. Usually only one branch (coil) of a motor is active and the other coils can be used for the DC-to-DC conversion. Coils L3 and L4 are used for DC-to-DC conversion, coils L1 and L2 are used to drive the rotor of the electric motor. The switching sequence itself is depending on the motor design. FIG. 4 shows an example of an arrangement of switches. Other arrangements would be also possible. A basic principle is implemented in the arrangement of FIG. 4 namely a switch to ground will be modulated and the switch to the diode has to be opened to get a step up function. As example in regard of coil L3, used for a DC-to-DC conversion, switch S2 is modulated, switch S3 is open, and switch S4 is closed. Alternatively the diodes D1, D2, and D3 can be replaced by an active rectifiers, i.e. by switches, as being used with synchronous DC-to-DC converters.

In summary it should be noted that the advantage of the invention is that the coil of a motor can be used twice, i.e. for the motor and for a DC-to-DC conversion. Therefore precious space can be saved.

Figure 2:
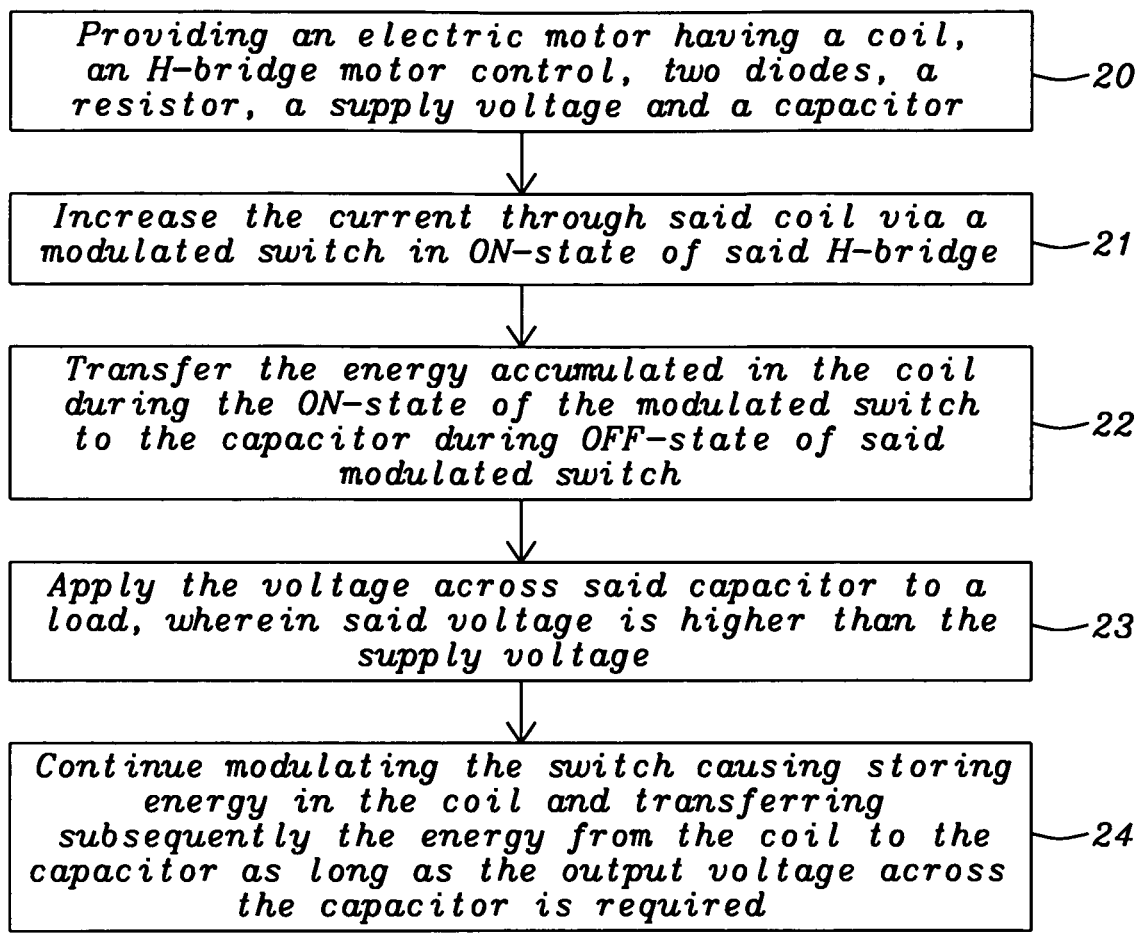
FIG. 2 illustrates a flowchart of a method invented to use an electric motor coil as inductor of a DC-to-DC converter.

FIG. 2 illustrates a flowchart of a method invented to use an electric motor coil as inductor of a DC-to-DC converter. A first step 20 describes the provision of an electric motor having a coil, an H-bridge motor control, two diodes, a resistor, a supply voltage and a capacitor. The following step 21 describes increasing the current through said coil via a modulated switch in ON-state of said H-bridge. In step 22 the energy accumulated in the coil during the On-state of the modulated switch is transferred to the capacitor during OFF state of said modulated switch. In the following step 23 the voltage across said capacitor is applied to a load, wherein said voltage is higher than the supply voltage. Step 34 illustrates the continuation of the modulation of the switch causing storing energy in the coil and transferring subsequently the energy from the coil to the capacitor as long as the output voltage across the capacitor is required.

It should be understood that the present invention can be used for every coil driven system. It has of course to be ensured that besides a DC-to-DC conversion sufficient energy is left to drive the motor.

While the invention has been particularly shown and described with reference to the preferred embodiments thereof, it will be understood by those skilled in the art that various changes in form and details may be made without departing from the spirit and scope of the invention.

What is claimed is:

1. A method to use an electric motor coil as inductor of a DC-to-DC converter comprising the following steps:
   (1) providing an electric motor having a coil, an H-bridge motor control, two diodes, a supply voltage, a load, and a capacitor, wherein the capacitor is arranged in parallel to the load;
   (2) increasing the current through said coil via a modulated switch in ON-state of said H-bridge;
   (3) transferring the energy accumulated in the coil during the On-state of the modulated switch to the capacitor during OFF state of said modulated switch;
   (4) applying the total voltage across said capacitor to the load, wherein said voltage is higher than the supply voltage; and
   (5) continuing modulating the switch causing storing energy in the coil and transferring subsequently the energy from the coil to the capacitor as long as the output voltage across the capacitor is required.

2. The method of claim 1 wherein a first part of said motor coil is used exclusively for DC-to-DC conversion and a second part of the coil is used for purposes of a motor.

3. The method of claim 1 wherein said DC-to-DC conversion is a DC boost conversion.

4. The method of claim 1 wherein said electric motor has four coils and wherein two of the four coils are used for DC-to-DC conversion.

5. The method of claim 1 wherein one of said diodes is replaced by a switch.

6. A system for a DC-to-DC conversion using the inductance of a motor coil comprising:
   a first switch having a first terminal connected to a supply voltage and a second terminal connected to a first terminal of a second switch and to a first terminal of a electric motor coil;
   said second switch having a second terminal connected to ground;
   a third switch having a first terminal connected to a supply voltage and a second terminal connected to a first terminal of a fourth switch and to a second terminal of said motor coil;
   said fourth switch having a second terminal connected to ground;
   said motor coil;
   a first diode having its anode connected to said first terminal of said motor coil and to the second terminal of said first switch and its cathode connected to a first terminal of a capacitor;
   a second diode having its anode connected to said second terminal of said motor coil and to the second terminal of the third switch and its cathode connected to the first terminal of the capacitor; and
   said capacitor, having its second terminal connected to ground, wherein a load is arranged in parallel to the capacitor and the voltage across the capacitor is the output voltage of the DC-DC converter.

7. The system of claim 6 wherein a first part of said motor coil is used exclusively for DC-to-DC conversion and a second part of the coil is used for purposes of a motor.

8. The system of claim 6 wherein a resistor is deployed in series with said motor coil.

9. The system of claim 6 wherein for a boost DC conversion said first switch is modulated and said fourth switch is closed.

10. The system of claim 9 wherein said modulation is a pulse-width modulation.

11. The system of claim 6 wherein for a boost DC conversion said third switch is modulated and said second switch is closed.

12. The system of claim 6 wherein for a boost DC conversion alternately said first switch is modulated while said fourth switch is closed and then said third switch is modulated while said second switch is closed.

13. The system of claim 6 wherein said first diode is replaced by a switch.

14. A system for a DC-to-DC conversion using the inductances of a electric motor comprising:
   a first pair of motor coils, comprising a first and a second coil connected in series, wherein a first terminal of a first coil is connected to a of second terminals of a seventh and a eighth switch, wherein a second terminal of said first coil is connected to each of second terminals of a tenth and a ninth switch, and to a first terminal of said second coil, and wherein a second terminal of said second coil is connected to each of second terminals of a eleventh and a twelfth switch;
   said eighth, ninth, and twelfth switches having each second terminals connected to a first terminal of a supply voltage;
   said seventh, tenth, and eleventh switches having each second terminals connected to a second terminal of the supply voltage;
   first, second and third diodes having each cathodes connected to a first terminal of a capacitor, wherein an anode of the first diode is connected to a first terminal of a fourth switch and to a first terminal of a third switch, wherein an anode of the second diode is connected to a first terminal of a first switch and to a first terminal of a second switch, and wherein an anode of a third switch is connected to a first terminal of a sixth switch and to a first terminal of a fifth switch;
   said capacitor, having its second terminal connected to ground, wherein the voltage across the capacitor is the output voltage of the DC-DC converter;
   a second pair of motor coils, comprising a third and a fourth coil connected in series, wherein a first terminal of a first coil is connected to each of first terminals of the third and fourth switch, wherein a second terminal of said first coil is connected to each of the first terminals of the first and second switch, and to a first terminal of said fourth coil, and wherein a second terminal of said fourth coil is connected to each of the first terminals of the sixth and fifth switch;

said fourth, first, and sixth switches having each a second terminals connected to the first terminal of the supply voltage;
said third, second, and fifth switches having each a second terminals connected to the second terminal of the supply voltage; and
said supply voltage, wherein its second terminal is connected to ground.

15. The system of claim 14 wherein said first pair of motor coils is used for DC-to-DC conversion and said second pair of motor coils is used drive the rotor of the electric motor.

16. The system of claim 14 wherein said first, second and third diodes are replaced by switches.

* * * * *